US010146329B2

(12) United States Patent
Pang et al.

(10) Patent No.: US 10,146,329 B2
(45) Date of Patent: Dec. 4, 2018

(54) METHOD AND APPARATUS FOR PROVIDING DIFFERENT USER INTERFACE EFFECTS FOR DIFFERENT MOTION GESTURES AND MOTION PROPERTIES

(75) Inventors: Hawk-Yin Pang, San Jose, CA (US); Péter Pál Boda, Palo Alto, CA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 1168 days.

(21) Appl. No.: 13/035,672

(22) Filed: Feb. 25, 2011

(65) Prior Publication Data

US 2012/0218177 A1 Aug. 30, 2012

(51) Int. Cl.
G06F 3/041 (2006.01)
G06F 3/0346 (2013.01)
G06F 3/0484 (2013.01)

(52) U.S. Cl.
CPC .......... *G06F 3/0346* (2013.01); *G06F 3/0484* (2013.01); *G09G 2320/0261* (2013.01); *G09G 2354/00* (2013.01)

(58) Field of Classification Search
CPC ................ G06F 3/0346; G06F 3/0484; G09G 2320/0261; G09G 2354/00
See application file for complete search history.

(56) References Cited

U.S. PATENT DOCUMENTS

| | | | | |
|---|---|---|---|---|
| 5,592,608 | A * | 1/1997 | Weber et al. | 715/863 |
| 6,792,082 | B1 * | 9/2004 | Levine | 379/67.1 |
| 2005/0212759 | A1 * | 9/2005 | Marvit et al. | 345/156 |
| 2005/0219228 | A1 * | 10/2005 | Alameh et al. | 345/173 |
| 2005/0253806 | A1 * | 11/2005 | Liberty et al. | 345/156 |
| 2007/0085157 | A1 * | 4/2007 | Fadell et al. | 257/428 |
| 2007/0161410 | A1 * | 7/2007 | Huang et al. | 455/565 |
| 2008/0016158 | A1 * | 1/2008 | Bin | 709/206 |
| 2008/0077865 | A1 * | 3/2008 | Hiles et al. | 715/708 |
| 2008/0081656 | A1 | 4/2008 | Hiles | |
| 2009/0262074 | A1 * | 10/2009 | Nasiri et al. | 345/158 |
| 2010/0235667 | A1 | 9/2010 | Mucignat et al. | |
| 2010/0245277 | A1 * | 9/2010 | Nakao | 345/173 |
| 2010/0306714 | A1 * | 12/2010 | Latta et al. | 715/863 |
| 2010/0306718 | A1 | 12/2010 | Shim et al. | |
| 2010/0321286 | A1 * | 12/2010 | Haggerty et al. | 345/156 |
| 2012/0120000 | A1 * | 5/2012 | Lucic et al. | 345/173 |

FOREIGN PATENT DOCUMENTS

WO WO 2007/0112788 A1 10/2007

OTHER PUBLICATIONS

International Search Report and Written Opinion for Application No. PCT/FI2012/050185 dated Jun. 19, 2012.

* cited by examiner

*Primary Examiner* — Adam R Giesy
(74) *Attorney, Agent, or Firm* — Alston & Bird LLP

(57) ABSTRACT

A method for providing a mechanism by which different user interface effects may be performed for different motion events may include receiving an indication of a motion event at a motion sensor, determining a motion gesture of the motion event, determining a motion property of the motion event, and enabling provision a user interface effect based on the motion property of the motion event. A corresponding apparatus and computer program product are also provided.

20 Claims, 4 Drawing Sheets

METHOD AND APPARATUS FOR PROVIDING DIFFERENT USER INTERFACE EFFECTS FOR DIFFERENT MOTION GESTURES AND MOTION PROPERTIES

TECHNOLOGICAL FIELD

Some example embodiments of the present invention relate generally to user interface technology and, more particularly, relate to a method and apparatus for providing a mechanism by which different user interface effects, such as a motion gesture, may be interpreted as an input based upon the motion property of the motion gesture.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, web browsing, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, electronic book or reading device, etc. Further, services may include a hybrid of both network-based elements and mobile device(s) functioning in concert to deliver the user experience.

In many situations, it may be desirable for the user to interface with a device such as a mobile terminal for the provision of an application or service. A user's experience during certain applications such as, for example, web browsing or navigating through content may be performed through existing methods of a touch screen interface or a tactile keypad; however, as a small size is often desirable for portable devices, alternate methods for a user interface to provide input may be similarly desirable. Physical device input elements, such as keys of a keypad or touch screens may have limited size thereby limiting the number of available inputs. Multiplexing the available inputs through multi-function keys, menus, or windows enhances the number of available inputs, but requires multiple keystrokes or more complex operations. Further enhancing user interface options may improve a user's experience and increase the popularity and functionality of a device.

BRIEF SUMMARY

A method, apparatus and computer program product are provided to enable the provision of a mechanism by which different user interface effects may be performed for different motion events. In some cases, for example, the effect that is performed for a particular motion (e.g., locking or unlocking the touch screen of a device) may be altered when a threshold for a particular motion property associated with the motion event is met. As such, for example, a first user interface effect may be performed until the threshold is met and a second user interface effect may be performed after the threshold is crossed.

Some embodiments of the invention may provide a method, apparatus and computer program product for improving user experience relating to devices having a motion gesture interface. As a result, for example, mobile terminal users may enjoy improved capabilities with respect to content navigation and other services or applications that may be used in connection with a motion sensor.

An example embodiment may provide a method for receiving an indication of a motion event at a motion sensor. The method may then determine a motion gesture of the motion event and determine a motion property of the motion event. The method may further enable provision of a user interface effect based on the motion property of the motion event. Determining a motion gesture may include determining a movement pattern corresponding to the motion event. Determining the motion property may further include determining if the property of the motion event exceeds a threshold or corresponds to a pre-defined property type. Enabling provision of a user interface effect based on the motion property of the motion event may include enabling provision of a first user interface effect in response to a first motion property and enabling provision of a second user interface effect in response to a second motion property, the first user interface effect and the second user interface effect being different from one another. Enabling provision a user interface effect based on the motion property of the motion event may include enabling provision of sending a message which includes a pre-defined text. The motion property may include at least one of acceleration of the motion event, speed of the motion event, direction of the motion event, and orientation during the motion event. The method may further include determining a motion context of the motion event, wherein enabling provision of a user interface effect based on the motion property of the motion event further includes enabling provision of the user interface effect based upon the motion context. The motion context may be a currently running application or a spatial orientation of a device. The motion context may include a condition of a device where the condition may include a dark environment, a bright environment, a temperature, a pulse rate, a grip force, or a sustained speed of motion.

Another example embodiment may provide an apparatus including at least one processor and at least one memory including computer program code, the at least one memory and the computer program code configured to, with the processor, cause the apparatus to at least receive an indication of a motion event at a motion sensor, determine a motion gesture of the motion event, determine a motion property of the motion event, and enable provision of a user interface effect based on the motion property of the motion event. Causing the apparatus to determine a motion gesture may include causing the apparatus to determine a movement pattern corresponding to the motion event. Causing the apparatus to determine the motion property may further include causing the apparatus to determine if the property of the motion event exceeds a threshold or corresponds to a pre-defined property type. Causing the apparatus to enable provision of a user interface effect based on the motion property of the motion event may include causing the apparatus to enable provision of a first user interface effect in response to a first motion property and causing the apparatus to enable provision of a second user interface effect in response to a second motion property, the first user interface effect and the second user interface effect being different from each other. Causing the apparatus to enable provision of a user interface effect based on the motion property of the motion event may include causing the apparatus to enable provision of sending a message which includes pre-defined text. The motion property may include one or more of acceleration of the motion event, speed of the motion event, direction of the motion event, and orientation during the motion event. The method may further include causing the apparatus to determine a motion context of the motion event, where causing the apparatus to enable provision of a user interface effect based on the motion property of the motion event may further include causing the apparatus to enable provision of the user interface effect based upon the motion context of the motion event. The motion context may include a currently running application or a spatial orientation of a device. The motion context may include a condition of a device where the condition may include a dark environment, a bright environment, a temperature, a pulse rate, a grip force, or a sustained speed of motion.

Another example embodiment may provide a computer program product comprising at least one non-transitory computer-readable storage medium having computer-executable program code instructions stored therein, the computer-executable program code instructions comprising program code instructions to receive an indication of a motion event at a motion sensor, determine a motion gesture of the motion event, determine a motion property of the motion event, and enable provision of a user interface effect based on the motion property of the motion event. The program code instructions to determine a motion gesture may include program code instructions to determine a movement pattern corresponding to the motion event. The program code instructions to determine the motion property may further include program code instructions to determine if the property of the motion event exceeds a threshold or corresponds to a pre-defined property type. The program code instructions to enable provision of a user interface effect based on the motion property of the motion event may include program code instructions to enable provision of a first user interface effect in response to a first motion property and program code instructions to enable provision of a second user interface effect in response to a second motion property, the first user interface effect and the second user interface effect being different from each other. The program code instructions to enable provision of a user interface effect based on the motion property of the motion event may include program code instructions to enable provision of sending a message which includes predefined text. The computer program product may further include program code instructions to determine a motion context of the motion event, where the program code instructions to enable provision of a user interface effect based on the motion property of the motion event may further include program code instructions for enabling provision of the user interface effect based on the motion context of the motion event. The motion context may be a currently running application or a spatial orientation of a device. The motion context may include a condition of a device, where the condition may include a dark environment, a bright environment, a temperature, a grip force, or a sustained speed of motion.

Another example embodiment may provide an apparatus including means for receiving an indication of a motion event at a motion sensor. The apparatus may include means for receiving an indication of a motion event at a motion sensor, means for determining a motion gesture of the motion event, means for determining a motion property of the motion event, and means for enabling provision of a user interface effect based on the motion property of the motion event. The means for determining a motion gesture may include means for determining a movement pattern corresponding to the motion event. The means for determining the motion property may further include means for determining if the property of the motion event exceeds a threshold or corresponds to a pre-defined property type. The means for enabling provision of a user interface effect based on the motion property of the motion event may include means for enabling provision of a first user interface effect in response to a first motion property and means for enabling provision of a second user interface effect in response to a second motion property, the first user interface effect and the second user interface effect being different from each other. The means for enabling provision of a user interface effect based on the motion property of the motion event may include means for enabling provision of sending a message which includes pre-defined text. Different motion properties may include one or more of acceleration of the motion event, speed of the motion event, different direction of the motion event, and different orientation during the motion event. The apparatus may further include means for determining a motion context of the motion event, where the means to enable provision of a user interface effect based on the motion property of the motion event further includes means for enabling provision of the user interface effect based upon the motion context of the motion event. The motion context may include a currently running application or a spatial orientation of a device. The motion context may include a condition of a device where the condition may include a dark environment, a bright environment, a temperature, a grip force, or a sustained speed of motion.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

Figure 3:
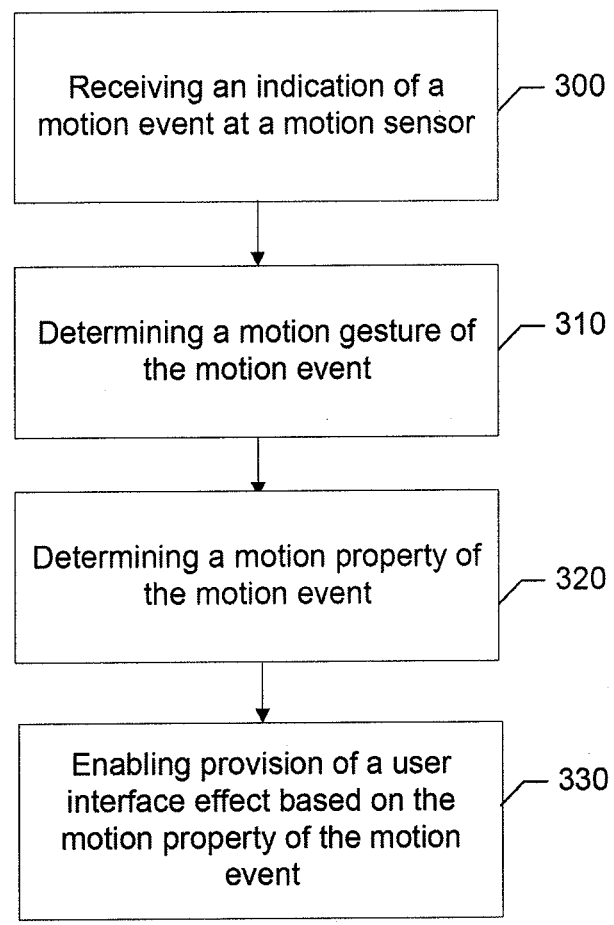
Figure 4:
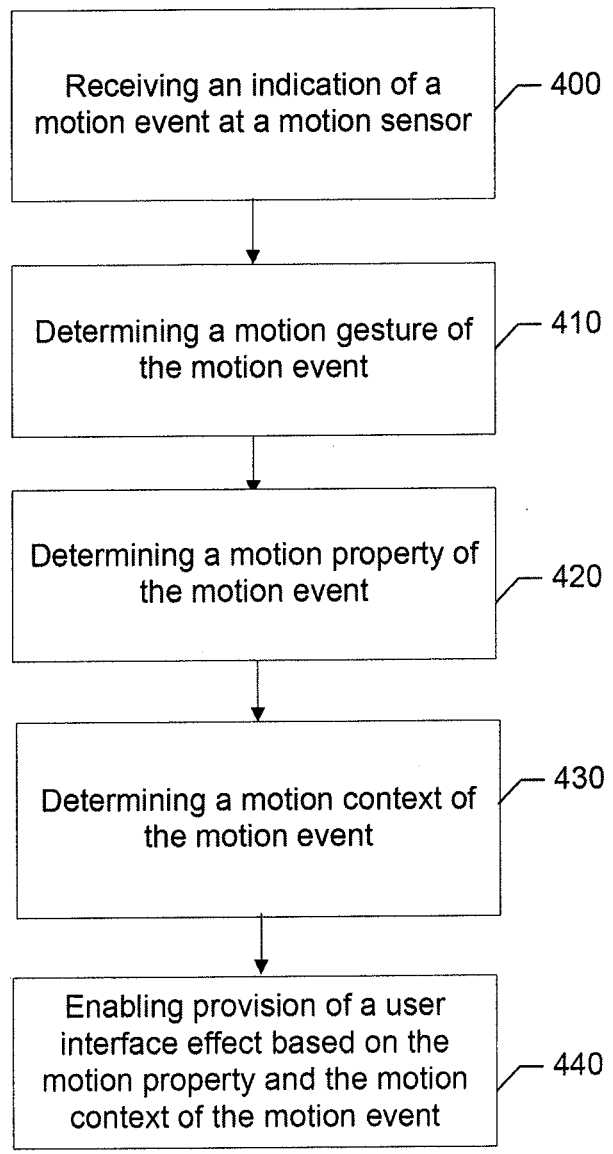

FIG. 3 is a block diagram according to an example method for providing a mechanism by which different user interface effects may be performed for different motion events according to an example embodiment of the present invention; and FIG. 4 is a block diagram according to an example method for providing a mechanism by which different user interface effect may be performed for different motion events according to another example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Some embodiments of the present invention may relate to a provision of a mechanism by which the user interface is enhanced beyond the touch of virtual or physical keys or physical gestures interpreted by a touch screen. The physical manipulation or motion of a device may be interpreted by the device to be an input. Motion such as placing the device with a display side facing down may silence a device (e.g., reduce ring-tone volume, reduce audible alert volumes, etc.). Further motion of a device through a two-dimensional or three-dimensional pattern may be interpreted by the device as an input. Beyond the two- or three-dimensional pattern, the speed, acceleration, or orientation of the device may provide additional levels of input that are interpreted by the device. The multiplexing of motion characteristics may allow a user to interface with a device while reducing the number of input touches or gestures required.

Embodiments of the present invention may enhance or multiplex a finite set of movement patterns (e.g., the finite set of movement patterns may be those that a user may be expected to remember) by increasing the number of movement properties recognized with regard to the finite set of movement patterns. The additional dimension of movement property recognition may facilitate additional dimensions of user interface, such as more subtle "messaging" to the user interface. Embodiments of the present invention may further enhance the finite set of movement patterns by recognizing a motion context (e.g., a user input motion that is aware of the active application on the device) to further influence how a single motion or finite set of motions may be interpreted as various user inputs to result in a wider variety of user input effects. The motion context may include an application which is currently active, such as a primary application in use on a device. The motion context may further include the orientation of a device, such as face-up, face-down, inverted, or other spatial orientation recognized by the device, such as through a sensor. Additionally, the motion context may include a condition of a device, such as a condition sensed by a sensor of the device. Conditions may include wherein the device is in a dark environment (e.g., a pocket) or in a bright environment (e.g., daylight or a well-lit room), whether the device is being held by a user or not (e.g., through temperature sensing of a hand), and whether the device is experiencing sustained movement (e.g., a GPS speed detected indicating walking, running, cycling, in an automobile, or in an airplane). Further conditions may include the condition of a user sensed by the device, such as the temperature of a hand holding the device, the pulse-rate of a user holding the device, or the force with which a user is gripping or holding the device.

Some embodiments of the present invention may relate to the provision of a mechanism by which substantively different user interface effects may be performed for different motion events based on motion gestures and motion property. Thus, for example, in the case of a particular motion event (e.g., a movement in a figure eight), a first type of user interface effect may be induced when the motion event occurs with a first motion property (e.g., speed of movement) that is low and a second type of user interface effect may be induced when the motion event occurs when the motion property is high. The first and second types of user interface effects may be different from each other in a manner other than simply a matter of degree. The phrase substantively different user interface effects, as used herein, may refer to user interface effects that effect differing results when executed. In this regard, having a slow motion property may provide a first user interface effect such as a predefined response to an SMS (short message service) text message while a fast motion property may provide a second user interface effect such as a different predefined response to an SMS message, e.g., with emoticons or emotion indicating icons. Example embodiments may provide for substantive differences between the first and second types or classes of user interface effects.

It should be appreciated that, in the context of example embodiments, a motion property relates to a characterization of the manner in which a particular motion gesture is performed. Thus, for example, motion properties may include different speeds, directions, accelerations, or even orientation of the device performing the motion gesture.

In some cases, motion events for which example embodiments may be employed may include those motion events that are received in association with an active application or function of a device, such as a music player program, a text message program, or a voice call among others. The active application, e.g., the motion context, may alter the interface effect of a particular motion event or possibly limit the motion events that are available for input in the active application or function. Optionally, motion events may further include device orientation as a motion context wherein the spatial orientation of the device may alter the interface effect of a particular motion event.

Figure 1:
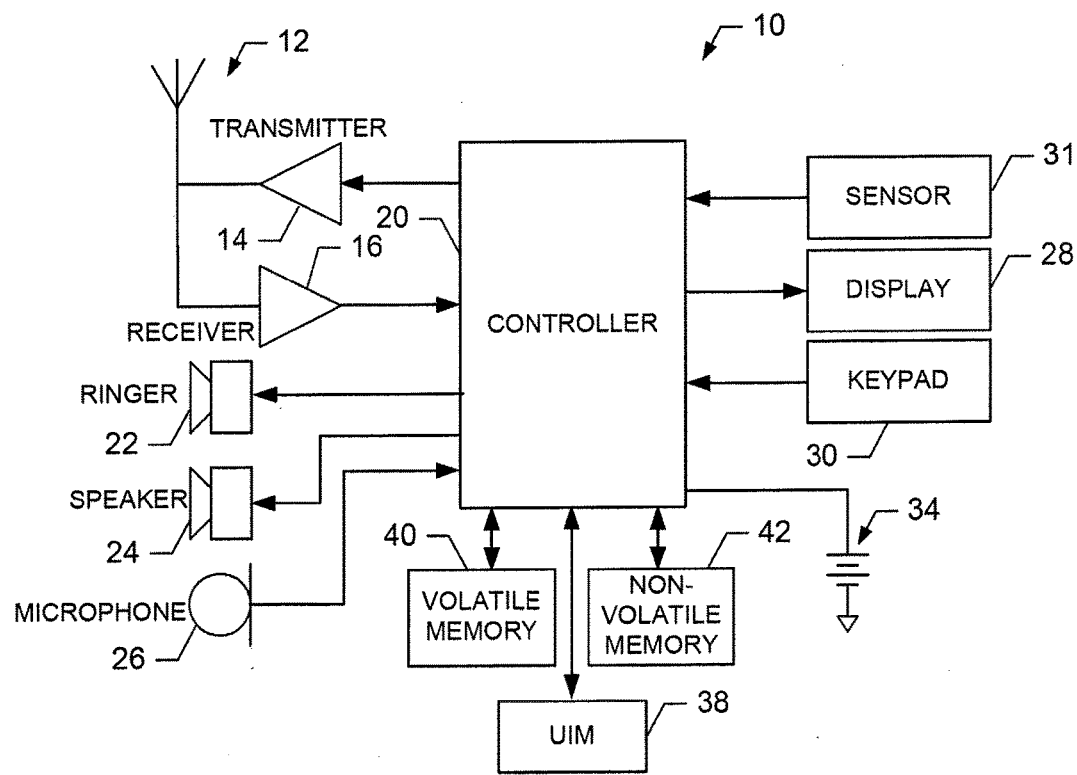
FIG. 1 is a schematic block diagram of a mobile terminal according to an example embodiment of the present invention.

FIG. 1, one example embodiment of the invention, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a controller 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the controller 20 may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (display 28 providing an example of such a touch display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch display may omit the keypad 30 and any or all of the speaker 24, ringer 22, and microphone 26 entirely. Additional input to the controller 20 may include a sensor 31. The sensor 31 may include one or more of a motion sensor, temperature sensor, light sensor, accelerometer, or the like. Forms of input that may be received by the sensor may include physical motion of the mobile terminal 10, whether or not the mobile terminal 10 is in a dark environment (e.g., a pocket) or in daylight, whether the mobile terminal is being held by a user or not (e.g., through temperature sensing of a hand). The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element (not shown) in order to capture images or video of objects, people and places proximate to the user of the mobile terminal 10. However, the mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, in which certain elements of an apparatus 50 for providing a mechanism by which relevant content may be determined and/or presented are displayed. The apparatus 50 of FIG. 2 may be employed, for example, in conjunction with the mobile terminal 10 of FIG. 1. The user interface 72 of FIG. 2 may include one or more of the sensor 31, display 28, and keypad 30 of the mobile terminal of FIG. 1. The processor 70 of FIG. 2 may be embodied in the controller 20 of FIG. 1 and the communications interface 72 may include the transmitter 14, receiver 16, and antenna 12 of the mobile terminal 10. However, it should be noted that the apparatus 50 of FIG. 2, may also be employed in connection with a variety of other devices, both mobile and fixed, and therefore, embodiments of the present invention should not be limited to application on devices such as the mobile terminal 10 of FIG. 1.

Figure 2:
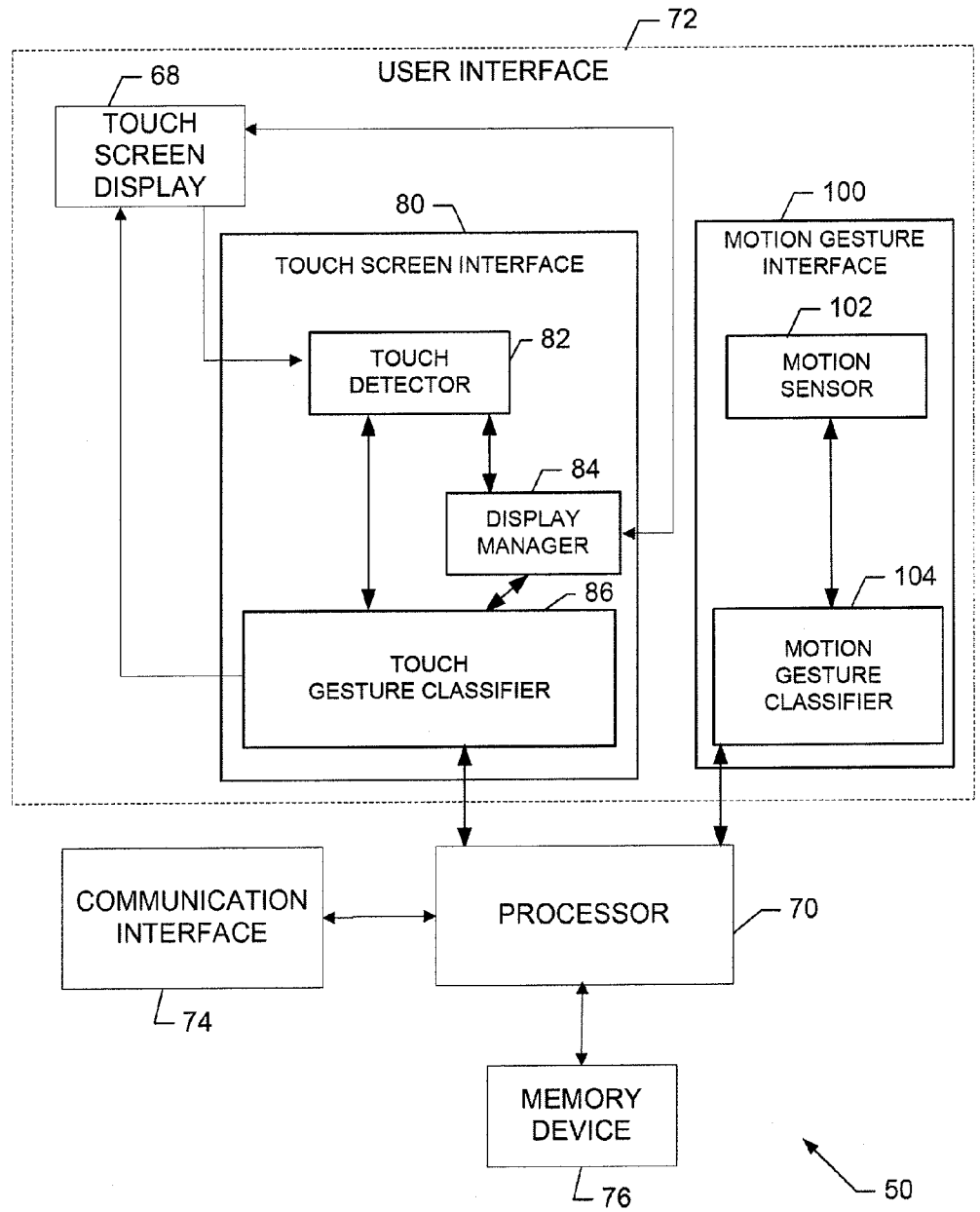
FIG. 2 is a schematic block diagram of an apparatus for providing a mechanism by which different user interface effects may be performed for motion properties of motion gestures according to an example embodiment of the present invention.

It should also be noted that while FIG. 2 illustrates one example of a configuration of an apparatus for providing a mechanism by which substantively different user interface effects may be performed for different classifications of motion gestures, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 2, the apparatus 50 for providing a mechanism by which substantively different user interface effects may be performed for different motion events is provided and may include or otherwise be in communication with a processor 70, a user interface 72, a communication interface 74 and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen(s), touch areas, device surfaces capable of detecting objects hovering over the surface, soft keys, a microphone, a speaker, motion sensor, temperature sensor, accelerometer, or other input/output mechanisms. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the apparatus 50 may include or otherwise be in communication with a touch screen display 68 (e.g., the display 28). In different example cases, the touch screen display 68 may be a two dimensional (2D) or three dimensional (3D) display. The touch screen display 68 may be embodied as any known touch screen display. Thus, for example, the touch screen display 68 could be configured to enable touch recognition by any suitable technique, such as resistive, capacitive, infrared, strain gauge, surface wave, optical imaging, dispersive signal technology, acoustic pulse recognition, etc. techniques. The user interface 72 may be in communication with the touch screen display 68 to receive indications of user inputs at the touch screen display 68 and to modify a response to such indications based on corresponding user actions that may be inferred or otherwise determined responsive to the indications. In one alternative, a touch input may be provided other than by direct interaction with a display (e.g., in cases where the user interface is projected onto a wall with a projector).

In an example embodiment, the apparatus 50 may include a touch screen interface 80. The touch screen interface 80 may, in some instances, be a portion of the user interface 72. However, in some alternative embodiments, the touch screen interface 80 may be embodied as the processor 70 or may be a separate entity controlled by the processor 70. As such, in some embodiments, the processor 70 may be said to cause, direct or control the execution or occurrence of the various functions attributed to the touch screen interface 80 (and any components of the touch screen interface 80) as described herein. The touch screen interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch screen interface 80 as described herein. Thus, in examples in which software is employed, a device or circuitry (e.g., the processor 70 in one example) executing the software forms the structure associated with such means.

The touch screen interface 80 may be configured to receive an indication of an input in the form of a touch event at the touch screen display 68. As such, the touch screen interface 80 may be in communication with the touch screen display 68 to receive indications of user inputs at the touch screen display 68 and to modify a response to such indications based on corresponding user actions that may be inferred or otherwise determined responsive to the indications. Following recognition of a touch event, the touch screen interface 80 may be configured to determine a classification of the touch event and provide a corresponding function based on the touch event in some situations.

In some embodiments, the touch screen interface 80 may include a detector 82, a display manager 84 and a touch gesture classifier 86. Each of the detector 82, the display manager 84 and the touch gesture classifier 86 may be any device or means embodied in either hardware or a combination of hardware and software configured to perform the corresponding functions associated with the detector 82, the display manager 84 and the touch gesture classifier 86, respectively, as described herein. In an exemplary embodiment, each of the detector 82, the display manager 84 and the touch gesture classifier 86 may be controlled by or otherwise embodied as the processor 70.

The detector 82 may be in communication with the touch screen display 68 to receive indications of user inputs in order to recognize and/or determine a touch event based on each input received at the detector 82. A touch event may be defined as a detection of an object, such as a stylus, finger, pen, pencil or any other pointing device, coming into contact with a portion of the touch screen display in a manner sufficient to register as a touch. In this regard, for example, a touch event could be a detection of pressure on the screen of the touch screen display 68 above a particular pressure threshold over a given area or the detection of a change in the electrostatic field of the touch screen display 68 at a particular location. As such, some touch events may not actually require physical contact with the touch screen display 68. For example, in some cases, the touch screen display 68 may be configured to detect one or more objects (e.g., a finger or fingers) hovering over the touch screen display 68. Interactions that involve objects that hover over the display can be especially useful features when used in connection with 3D displays where UI objects can appear to float visually on top of the device surface or float behind the device surface in the depth. Gestures associated with the object or objects may also be detected in some cases, even without physical contact with the touch screen display 68. Subsequent to each touch event, the detector 82 may be further configured to pass along the data corresponding to the touch event (e.g., location of touch, length of touch, number of objects touching, touch pressure, speed of movement, speed of finger movement towards the screen (when approaching the screen), direction of movement, length of delay, frequency of touch, etc.) to the gesture classifier 86 for gesture classification.

The touch gesture classifier 86 may be configured to recognize and/or determine a corresponding classification of a touch event. In other words, the gesture classifier 86 may be configured to perform gesture classification to classify the touch event as any of a number of possible gestures. Some examples of recognizable gestures may include a touch, multi-touch, stroke, character, symbol, shape, swipe, pinch event (e.g., a pinch in or pinch out) and/or the like.

In an example embodiment, the apparatus 50 may include a motion gesture interface 100. The motion gesture interface 100 may, in some instances, be a portion of the user interface 72. However, in some alternative embodiments, the motion gesture interface 100 may be embodied as the processor 70 or may be a separate entity controlled by the processor 70. As such, in some embodiments, the processor 70 may be said to cause, direct, or control the execution or occurrence of the various functions attributed to the motion gesture interface 100 (and any components of the motion gesture interface 100) as described herein. The motion gesture interface 100 may be any means such as a device or circuitry operating in accordance with software or otherwise embodied in hardware or a combination of hardware and software (e.g., processor 70 operating under software control, the processor embodied as an ASIC or FPGA specifically configured to perform the operations described herein, or a combination thereof) thereby configuring the device or circuitry to perform the corresponding functions of the motion gesture interface 100 as described herein. Thus, in examples in which software is employed, a device or circuitry (e.g., the processor 70 in one example) executing the software forms the structure associated with such means.

The motion gesture interface may be configured to receive an indication of an input in the form of a movement, acceleration, or positional change, at the motion sensor 102. The motion sensor 102 may be of any known type that is used to detect physical movement of the motion sensor 102 itself. In some embodiments, the motion gesture interface 100 may include a motion sensor 102 and a motion gesture classifier 104. Each of the motion sensor 102 and the motion gesture classifier 104 may be any device or means embodied in either hardware or a combination of hardware and software configured to perform the corresponding functions associated with the motion sensor 102 and the motion gesture classifier 104, respectively, as described herein. In an example embodiment, each of the motion sensor 102 and the motion gesture classifier 104 may be controlled by or otherwise embodied as the processor 70.

The motion sensor 102 may be in communication with a user device (such as mobile terminal 10) to receive indications of user inputs in the form of motion (e.g., movement of the device) in order to recognize and/or determine a motion event based on each input received at the motion sensor 102. A motion event may be defined as a direction of acceleration or movement in a particular direction or pattern with a particular speed or device orientation. In this regard, for example, a motion event could be a detection of dropping the device containing the motion sensor 102. The motion sensor 102 may be calibrated or configured to detect acceleration over a particular threshold such that inadvertent movement of the motion sensor 102 does not cause a motion event. For example, in some cases, the user interface 72 may be configured to detect a shaking motion that includes a force and frequency. The force may be determined, for example by the rate of acceleration and the frequency may be determined by the transitions between negative acceleration and positive acceleration or changes in the direction of the acceleration. The movement event may include motion gestures associated with a pattern that may also be detected. For example, if the motion sensor were to be moved in the pattern of an alphanumeric character. The motion detector may further detect the speed at which the alphanumeric character pattern was drawn. Subsequent to each motion event, the motion sensor 102 may be further configured to pass along data corresponding to the motion event (e.g., magnitude of acceleration or force, pattern of motion, frequency of shake, orientation of device, etc.) to the motion gesture classifier 104. Each motion event may correspond to an input or command for the device.

The motion gesture classifier 104 may be configured to recognize and/or determine a corresponding classification of a motion event. In other words, the motion gesture classifier 104 may be configured to perform motion gesture classification to classify the movement event as any number of possible motion gestures. Some examples of recognizable motion gestures may include a shake, movement in an S-pattern (or any alphanumeric pattern or symbol), a drop, a spin, a toss (e.g., throwing the device into the air), and/or the like.

In some embodiments, the motion gesture classifier 104 may be further enabled to determine motion properties regarding the motion events (e.g., magnitude of the force of motion, frequency, orientation of the device, etc.) in order to classify a particular motion event based on the motion properties of the gesture. As such, for example, the motion gesture classifier 104 may classify the motion events relative to various thresholds or ranges of force or frequency. Thus, the classification of a motion event may include motion gesture classification (e.g., pattern of motion) and classification of the motion properties (e.g., force, frequency, orientation of device, speed, dynamics, softness, "cursiveness" or smoothness, "edginess" or abruptness) of the corresponding motion gesture classification. Thus, the motion event may include both a motion gesture (e.g., pattern of movement) and a motion property (e.g., a speed, force, frequency, or orientation).

In an example embodiment, the motion gesture classifier 104 may compare motion properties for a given motion gesture classification to different respective thresholds or levels that may be defined for the given motion gesture classification. For example, a shake motion gesture (e.g., an oscillating motion of the device) may have a fast motion property that indicates a speed of shaking that is above a threshold (e.g. 100 oscillations per minute), and a slow motion property that indicates a speed of shaking that is below the threshold. A further motion property may include a force of the shaking, for example when a shaking motion is causing acceleration oscillations above a threshold force (e.g., 5Gs or five times the gravitational constant of the earth, 9.81 m/s$^2$), then the motion property of the motion gesture may be classified as "aggressive" while a shaking motion that causes acceleration oscillations below the threshold force may be classified as a "normal" motion gesture. Each motion event comprising a motion gesture and associated motion property may correspond to a substantively different user interface effect. The motion properties may serve to multiplex some or all of the motion gestures that are recognized by a motion gesture classifier.

In an example embodiment, the motion gesture classifier 104 may be configured to communicate detection information regarding the recognition, detection, and/or classification of a motion event to the processor 70. The processor 70 may be configured to respond or react to an user interface effect that corresponds to the motion event including the motion gesture and the motion property. As such, for example, if a clockwise circular motion is detected by the motion sensor as the motion gesture, and the circular motion is performed below a threshold speed as the motion property, the slow, clockwise circular motion event may correspond to a "lock" command to lock the touch screen display 68 of the device and preclude unintended or unauthorized input to the device. Alternatively, if the motion event includes a clockwise circular motion above the threshold speed, the gesture and motion property may correspond to a "power off" command that turns the device off. Similarly, a counter-clockwise circular motion gesture with a motion property of a slow speed (e.g., below the threshold) may correspond to an "unlock" command to permit touch screen interface with the device while a counter-clockwise circular motion gesture with a motion property of a high speed (e.g., above the threshold) may correspond to a "power on" command to the device.

As such, example embodiments may provide for an apparatus (e.g., the processor 70 or a chip set including the processor 70) for performing user interface effects that differ for a particular motion gesture based on the motion property used to affect the motion gesture. In some cases, the apparatus may be configured to receive an indication of a motion event at a motion gesture interface 100 that includes a motion gesture and a motion property. The device may interpret the motion event based upon the status of the device (e.g., during an incoming call, while a music player is operating, while in silent mode, etc.). The motion event may correspond to a substantively different user interface effect based upon the status of the device or the application currently running on the device. This added level of multiplexing of the motion events may increase the available commands to a user. The multiplexing may also simplify the user interface by precluding certain user interface effects that correspond to particular motion events when a particular application is active or dependent upon the status of the device, particularly when motion events may include similar characteristics such as the same gesture or the same motion property.

Some example embodiments will be described below in connection with motion events having various motion gestures, motion properties, and device statuses where the device status may include an active application or an event, such as an incoming call. However, it should be appreciated that the examples described below are non-limiting examples and thus, example embodiments could also cover other user interface effects and motion events consistent with the descriptions provided herein.

The motion property of a motion event may include various aspects of a movement event. For example, while a motion gesture may include drawing an alphanumeric character or symbol on a surface or in a three dimensional space, the motion property of the movement event may include whether the alpha numeric character was drawn in a forward motion or in a backward motion. The forward motion may be interpreted as a positive motion property while the backward or reverse motion may be interpreted as a negative motion property. The orientation of the device may also be construed as the motion property. For example, drawing a motion gesture when the device is in the standing up or upright position may indicate a positive response motion property while drawing a motion gesture when the device is laying flat may indicate a negative response motion property. The motion property may also be interpreted as an emotional state, such that a positive response motion property may represent a positive/happy emotional state, a negative response motion property may represent a negative/unhappy emotional state. Further motion property examples may include the speed at which a gesture is drawn or performed. For example, a motion gesture made quickly may indicate a positive or excited motion property while a motion gesture made slowly may represent a more negative or apathetic motion property. The motion property of a movement event may also be indicated by performing a motion property movement at the beginning or end of a motion gesture. For example, a length or intensity of a shake at the beginning of a gesture may indicate annoyance (small shake) or angry (strong shake) rather than a motion property expressed during the motion gesture.

Example embodiments may include user-configurable commands that are associated with motion events or an array of basic commands that are provided with the device or by an application or file stored to the device memory. Examples of such commands and the associated motion events may include wherein when a user induces a motion gesture of an "S" character drawn in the backwards or reverse motion property, the command may open or create an SMS text message, social network status field, or social network broadcast, etc. and populate the field with a predefined text corresponding to that motion event, such as a sad emotional response. Conversely, a motion gesture of an "S" character drawn in the forwards motion property may open or create an SMS text message, social network status field, or social network broadcast, etc. and populate the field with a predefined text corresponding to a positive, happy emotional response.

Another example embodiment may include wherein a user receives an SMS (short message service) text message requesting a response of yes or no. The motion event may include a gesture of a check mark (yes) or a cross or "X" (no) and the motion property may include large motions indicating the response is emphatic or enthusiastic. The device status having just received an SMS message may be configured to allow only motion events corresponding to possible responses to the SMS message for a predefined time after the message is received. Thus, a motion event received in a predefined time after a message is received may initiate and send a response to the message.

Devices configured to detect motion events including both a motion gesture and a motion property may be capable of determining the correct response required when performing a gesture to trigger an event or pre-fill information, for example, in a text field. Intelligent pre-filling of information may be based on contents of historical device activities (e.g. phone calls), location information, calendar events (e.g. meetings), activity recognition, etc. An example embodiment may include wherein a device may be aware of a user's present situation (e.g., in the library, in a meeting, in a car, etc.) and the device may pre-select a motion event library that includes only motion events (and the corresponding user interface effects) associated with the user's situation.

An example embodiment may include wherein a user is in a meeting that is scheduled on the calendar of the user (which is accessible or known to the device) and the user receives a voice call, SMS message, or email. A response motion event may include a lowercase letter m and the motion property may be a fast speed. Such a motion event may respond in the form of an pre-drafted SMS message, email, or prepared voice message that indicates that the user is in a meeting and very busy, with the fast motion property indicating anxiety or stress. A response motion event may include a lowercase m and the motion property may be a slow speed whereby the motion event causes a response in the form of a pre-drafted SMS message, email, or prepared voice message that indicates that the user is in a meeting but will respond as soon as possible. The slow motion property may indicate a calm response.

Another example embodiment may include wherein a user receives an email, SMS message, or voice mail that questions where the user is as a meeting is starting. The user may provide for a motion event that includes the letter "S" and in a slow motion property which generates a pre-drafted response in the form of an SMS message, email, or prepared voice message that indicate that the user is running behind and will be late. A fast motion property of the same motion gesture may generate a pre-drafted response that indicates the user is hurrying and will be present imminently. A further element of the motion property may be included which notes the orientation of the device. For example, if the device is lying flat while the "S" motion gesture is drawn, the response may be brief and include no superfluous information. However, if the device is upright while the motion gesture is made, the response may include a positive, personal touch to the response which may be in the form of a signature or a pre-drafted greeting.

It should be appreciated that although the above examples relate to embodiments being practiced in relation to user interface effects being applied to messaging and responses, example embodiments may also be practiced in connection with other applications or programs available on a device or possibly on a remote device that detects user input commands from the device. For example, while a device is playing a music track in a music player application, a motion event involving a gesture of the device being moved in an upward direction may increase the volume. The motion property may include a fast gesture or a slow gesture, wherein a fast gesture causes the volume to increase to a maximum volume while a slow gesture may increase the volume incrementally.

FIGS. 3 and 4 are flowcharts of methods and program products according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user device and executed by a processor in the user device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 3, may include receiving an indication of a motion event at a motion sensor at operation 300 and determining a motion gesture of the motion event at operation 310. The method may further include determining a motion property of the motion event at operation 320. The method may still further include enabling provision of a user interface effect based on the motion property of the motion event at operation 330.

A method according to another embodiment of the invention, as shown in FIG. 4, may include receiving an indication of a motion event at a motion sensor at operation 400. A motion gesture of the motion event may be determined at 410. A motion property of the motion event may be determined at 420. A motion context of the motion event may be determined at 430. A user interface effect based on the motion property and the motion context of the motion event may be enabled at 440.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein. In some embodiments, determining a motion event may include determining a motion gesture of the motion event. The motion gesture may include a pattern of the motion event. In an example embodiment, receiving a motion event may include determining the motion property of the motion event. The motion property may not include a pattern of the motion event. In another example embodiment, receiving a motion event may include determining a status of a device used to initiate the motion gestures associated with the motion property determined for the motion event relative to a threshold. In some cases, enabling provision of a user interface effect based on the motion property of the motion event may include enabling provision of a first user interface in response to a first motion property and enabling provision of a second user interface effect in response to a second motion property, the first and second user interface effects being different from one another. Additionally or alternatively, enabling provision a user interface effect based on the motion property of the motion event may include causing provision of sending a message which includes pre-defined text. The different motion properties may include one or more of different accelerations of the motion event, different speeds of the motion event, different direction of the motion event, and different orientation of a device during the motion event. In some embodiments, a motion context of the motion event may be determined and enabling provision of the user interface effect may be based upon the motion context and the motion property of the motion event. The motion context may include a currently running application or a spatial orientation of a device. The motion context may also include a condition sensed by a device such as a dark environment, a bright environment, a temperature, a pulse rate, a grip force, or a sustained speed of motion.

In an example embodiment, an apparatus for performing the method of FIGS. 3 and/or 4 above may comprise a processor (e.g., the processor 70) configured to perform some or each of the operations (300-330 and/or 400-440) described above. The processor 70 may, for example, be configured to perform the operations (300-330 and/or 400-440) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300-330 and/or 400-440 may comprise, for example, the motion gesture interface 100 (or respective different components thereof). Additionally or alternatively, at least by virtue of the fact that the processor 70 may be configured to control or even be embodied as the motion gesture interface 100, the processor 70 and/or a device or circuitry for executing instructions or executing an algorithm for processing information as described above may also form example means for performing operations 300-330 and/or 400-440.

An example of an apparatus according to an example embodiment may include at least one processor and at least one memory including computer program code. The at least one memory and the computer program code may be configured to, with the at least one processor, cause the apparatus to perform the operations 300-330 and/or 400-440 (with or without the modifications and amplifications described above in any combination).

An example of a computer program product according to an example embodiment may include at least one computer-readable storage medium having computer-executable program code portions stored therein. The computer-executable program code portions may include program code instructions for performing operation 300-330 and/or 400-440 (with or without the modifications and amplifications described above in any combination).

In some cases, the operations (300-330 and/or 400-440) described above, along with any of the modifications may be implemented in a method that involves facilitating access to at least one interface to allow access to at least one service via at least one network. In such cases, the at least one service may be said to perform at least operations 300 to 330 and 400 to 440.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving an indication of a motion event from a motion sensor;
   determining a motion gesture of the motion event;
   determining a motion property of the motion event, wherein the motion property includes at least one of a speed, force, frequency, orientation, acceleration, smoothness, or abruptness;
   determining a motion context of the motion event; and
   enabling provision of a user interface effect based on the motion property of the motion event and the motion context of the motion event, wherein the motion context includes a condition of a device, wherein the condition includes two or more of a dark environment, a bright environment, a temperature, a pulse rate, a grip force, or a sustained speed of motion;
   wherein enabling provision of a user interface effect based on the motion property of the motion event and the motion context of the motion event comprises enabling provision of a first user interface effect in response to a first motion event having a first motion gesture, a first motion property having a first value, and a first motion context, and enabling provision of a second user interface effect in response to a second motion event having the first motion gesture, the motion property having a second value different than the first value, and the first motion context, the first user interface effect and the second user interface effect being different from each other.

2. The method of claim 1, wherein determining a motion gesture comprises determining a movement pattern corresponding to the motion event.

3. The method of claim 1, wherein determining the motion property further comprises determining if the property of the motion event exceeds a threshold or corresponds to a pre-defined property type.

4. The method of claim 1, wherein enabling provision of a user interface effect based on the motion property of the motion event comprises enabling provision of sending a message which includes predefined text.

5. The method of claim 1, wherein motion properties comprise at least one of acceleration of the motion event, speed of the motion event, direction of the motion event, and orientation during the motion event.

6. The method of claim 1, wherein the motion context further includes at least one of a currently running application or a spatial orientation of a device.

7. The method of claim 1, wherein enabling provision of a user interface effect based on the motion property of the motion event and the motion context of the motion event further comprises enabling provision of a third user interface effect in response to a third motion event having the first motion gesture, the first motion property having a first value, and a second motion context, wherein the second motion context is different from the first motion context, and wherein the third user interface effect is different from the first user interface effect and the second user interface effect.

8. An apparatus comprising at least one processor and at least one memory including computer program code, the at least one memory and the computer program code configured to, with the processor, cause the apparatus to at least:
   receive an indication of a motion event from a motion sensor;
   determine a motion gesture of the motion event;
   determine a motion property of the motion event, wherein the motion property includes at least one of a speed, force, frequency, orientation, acceleration, smoothness, or abruptness;
   determine a motion context of the motion event; and
   enable provision of a user interface effect based on the motion property of the motion event and the motion context of the motion event, wherein the motion context includes a condition of a device, wherein the condition includes two or more of a dark environment, a bright environment, a temperature, a pulse rate, a grip force, or a sustained speed of motion;
   wherein causing the apparatus to enable provision of a user interface effect based on the motion property of the motion event and the motion context of the motion event comprises causing the apparatus to enable provision of a first user interface effect in response to a first motion event having a first motion gesture, a first motion property having a first value, and a first motion context, and causing the apparatus to enable provision of a second user interface effect in response to a second motion event having the first motion gesture, the motion property having a second value different than the first value, and the first motion context, the first user interface effect and the second user interface effect being different from each other.

9. The apparatus of claim 8, wherein causing the apparatus to determine a motion gesture comprises causing the apparatus to determine a movement pattern corresponding to the motion event.

10. The method of claim 8, wherein causing the apparatus to determine the motion property further comprises causing the apparatus to determine if the property of the motion event exceeds a threshold.

11. The method of claim 8, wherein causing the apparatus to enable provision of a user interface effect based on the motion property of the motion event comprises causing the apparatus to enable provision of sending a message which includes predefined text.

12. The method of claim 8, wherein motion properties comprise at least one of acceleration of the motion event, speed of the motion event, direction of the motion event, and orientation during the motion event.

13. The method of claim 8, wherein the motion context further comprises at least one of a currently running application or a spatial orientation of a device.

14. The apparatus of claim 8, wherein causing the apparatus to enable provision of a user interface effect based on the motion property of the motion event and the motion context of the motion event further comprises causing the apparatus to enable provision of a third user interface effect in response to a third motion event having the first motion gesture, the first motion property having a first value, and a second motion context, wherein the second motion context is different from the first motion context, and wherein the third user interface effect is different from the first user interface effect and the second user interface effect.

15. A computer program product comprising at least one non-transitory computer-readable storage medium having computer-executable program code instructions stored therein, the computer-executable program code instructions comprising program code instructions to:

receive an indication of a motion event from a motion sensor;

determine a motion gesture of the motion event;

determine a motion property of the motion event, wherein the motion property includes at least one of a speed, force, frequency, orientation, acceleration, smoothness, or abruptness;

determine a motion context of the motion event; and enable provision of a user interface effect based on the motion property of the motion event and the motion context of the motion event, wherein the motion context includes a condition of a device, wherein the condition includes two or more of a dark environment, a bright environment, a temperature, a pulse rate, a grip force, or a sustained speed of motion;

wherein the program code instructions to enable provision of a user interface effect based on the motion property of the motion event and the motion context of the motion event comprises program code instructions to enable provision of a first user interface effect in response to a first motion event having a first motion gesture, a first motion property having a first value, and a first motion context, and program code instructions to enable provision of a second user interface effect in response to a second motion event having the first motion gesture, the motion property having a second value different than the first value, and the first motion context, the first user interface effect and the second user interface effect being different from each other.

16. The computer program product of claim 15, wherein the program code instructions to determine a motion gesture comprises program code instructions to determine a movement pattern corresponding to the motion event.

17. The computer program product of claim 15, wherein the program code instructions to determine the motion property further comprises program code instructions to determine if the property of the motion event exceeds a threshold or corresponds to a pre-defined property type.

18. The computer program product of claim 15, wherein the program code instructions to enable provision of a user interface effect based on the motion property of the motion event comprises program code instructions to enable provision of sending a message which includes predefined text.

19. The computer program product of claim 15, wherein the motion context is at least one of a currently running application or a spatial orientation of a device.

20. The computer program product of claim 15, wherein the program code instructions to enable provision of a user interface effect based on the motion property of the motion event and the motion context of the motion event comprises program code instructions to enable provision of a third user interface effect in response to a third motion event having the first motion gesture, the first motion property having a first value, and a second motion context, wherein the second motion context is different from the first motion context, and wherein the third user interface effect is different from the first user interface effect and the second user interface effect.

* * * * *